DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 705

T888,005

PHOTOGRAPHIC SILVER HALIDE EMULSIONS HAVING INCREASED COVERING POWER

Glen M. Dappen and Thomas E. Whiteley, both of 1669 Lake Ave., Rochester, N.Y. 14615

Filed Sept. 4, 1970, Ser. No. 69,978
**Int. Cl. G03c *1/02***
U.S. Cl. 96—94
No Drawing. 17 Pages Specification

The covering power of developed silver of photographic gelatino silver halide coatings is increased by the addition of inorganic ammonium salt covering power agents such as ammonium sulfate or ammonium nitrate. These agents may be combined with a polyacrylamide to provide even greater increases in covering power. For example, a fine grained chlorobromide emulsion containing 60 g./mole Ag of $(NH_4)_2SO_4$ is coated on a cellulose acetate support at 168 mg./ft.$^2$ Ag and 600 mg./ft.$^2$ gelatin. Upon exposure and development it is found that the incorporation of the ammonium sulfate in the emulsion markedly increases the maximum density and the covering power of the developed silver, as compared with emulsions containing polymeric covering power agents.